(No Model.)

W. BALLOU.
ORNAMENTAL CHAIN.

No. 263,095. Patented Aug. 22, 1882.

WITNESSES:
Wm. L. Cooke,
H. J. Miller

INVENTOR:
Walter Ballou
by Jos. A. Miller & Co.
Attys

UNITED STATES PATENT OFFICE.

WALTER BALLOU, OF NORTH ATTLEBOROUGH, MASSACHUSETTS.

ORNAMENTAL CHAIN.

SPECIFICATION forming part of Letters Patent No. 263,095, dated August 22, 1882.

Application filed July 3, 1882. (No model.)

*To all whom it may concern:*

Be it known that I, WALTER BALLOU, of North Attleborough, in the county of Bristol and State of Massachusetts, have invented a new and useful Improvement in Ornamental Chains; and I hereby declare that the following is a full, clear, and exact description of the same, reference being had to the accompanying drawings, forming part of this specification.

This invention has reference to an improvement in ornamental chains used for bracelets and other ornamental purposes.

The invention consists in the novel and peculiar construction of the chain, by which pieces of tubular wire are secured together by means of loops of wire, as will be more fully set forth hereinafter.

Figure 1:
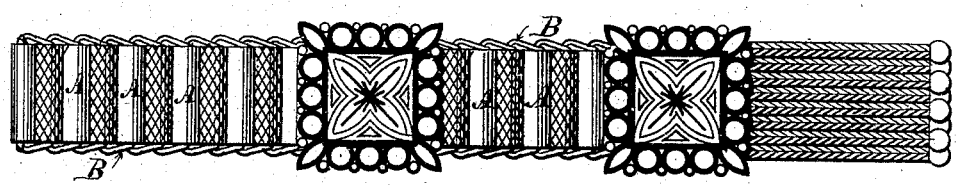
Figure 2:
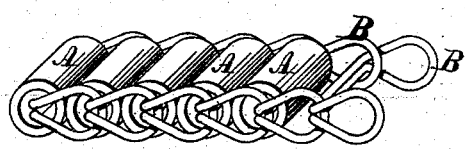
Figure 3:
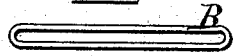
Figure 4:
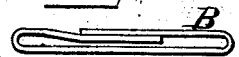

Figure 1 is a view of my improved chain, shown as formed into a chain-bracelet. Fig. 2 is a view on an enlarged scale of a piece of the chain, showing one of the loops inserted without the tube, so as to show the construction more clearly. Fig. 3 is a view of a soldered loop, and Fig. 4 is a view of a loop the ends of which are lapped over each other.

In the drawings, A A are short lengths of tubular wire. Pieces of plain and ornamented tubular wire are shown in Fig. 1, alternately, and this arrangement produces a very good effect; but the tubes may be all ornamented alike or arranged in various ways, having the same or different colors, so that a great variety of styles may be produced.

B B are loops of wire, which are inserted into one of the pieces of tubular wire A and bent over at each end, so that the next loop can be passed through the ends of the loop and through the next piece of tubular wire, and so a chain of any desired form be produced firmly linked together, the loops forming an ornamental edge to the chain. The loops may be soldered so as to form a continuous loop, as is shown in Fig. 3, or they may be made without solder by lapping the ends, and as the loops nearly fill the interior of the tubular wire they are not liable to separate.

The chain so formed is simple, cheap, and durable, and can be used for all purposes for which ornamental chains are now used.

Having thus described my invention, I claim as new and desire to secure by Letters Patent—

As a new article of manufacture, a chain made up of a number of pieces of tubular wire united together by loops of wire passing through the tubular wire and through the ends of the adjoining loop, as described.

WALTER BALLOU.

Witnesses:
HENRY J. MILLER,
WM. L. COOP.